Patented June 26, 1923.

1,460,097

UNITED STATES PATENT OFFICE.

JOHN M. DONOHUE AND EDWARD S. FARROW, JR., OF ROCHESTER, NEW YORK, ASSIGNORS TO EASTMAN KODAK COMPANY, OF ROCHESTER, NEW YORK, A CORPORATION OF NEW YORK.

CELLULOSE-ETHER FILM AND COMPOSITION FOR MAKING THE SAME.

No Drawing.    Application filed February 8, 1923.   Serial No. 617,864.

*To all whom it may concern:*

Be it known that we, JOHN M. DONOHUE and EDWARD S. FARROW, Jr., citizens of the United States of America, residing at Rochester, in the county of Monroe and State of New York, have invented certain new and useful Improvements in Cellulose - Ether Films and Compositions for Making the Same, of which the following is a full, clear, and exact specification.

This invention relates to cellulose ether films and compositions for making the same. One object of the invention is to provide films in which the flexibility is maintained even under severe conditions, such as prolonged heating. Another object of the invention is to provide a flowable film-forming composition which will be stable and will produce films which will likewise be stable and maintain their flexibility. Other objects will hereinafter appear.

In U. S. Patent No. 1,188,376, Lilienfeld, June 20, 1916, there are disclosed a series of alkyl ethers of cellulose. Certain of these are practically insoluble in water, and the present invention relates primarily to ethers having that property, although it is not restricted to them. When such ethers are made into films for different purposes, such as photographic supports or protective coatings, it is desirable, under circumstances which are often met with in practice, that they withstand prolonged heating without becoming brittle. In testing such films to determine whether they will withstand the conditions of practice, severe tests are customarily made by heating them for several weeks at a temperature of 65° C. It is desirable that the films remain flexible even after twelve weeks of continuous heating at the above temperature.

We have discovered that films which maintain their flexibility under the above described test may be prepared by incorporating one or more of the following substances in the film,—methyl acetanilid, acetyl p-phenetidine, diethyl carbanilide, analine acetate, phenyl urea, diphenyl ethylene di amine, phenyl naphthyl amine, benzanilide, para di methyl amino phenyl acetate. The stabilizing substance or mixture of such substances is incorporated with the cellulose ether by the aid of a common solvent, the resulting solution or dope being flowed or deposited and the films formed by evaporation of the volatile ingredients in the way understood by those skilled in the art. The stabilizers being of high boiling point remain in the necessary proportion in the final film or product.

For example, we may dissolve 20 parts of cellulose ether (say water-insoluble ethyl cellulose) and 2 parts of methyl acetanilid in a volatile solvent mixture comprising 90 parts of methyl acetate and 10 parts of methyl alcohol. Of course, these illustrative proportions can be varied widely. Where thin films or coatings are to be made by applying the composition in the form of a varnish, the amount of volatile solvent will be increased until the dope reaches the required thinness, as will be understood by those skilled in this art. With the proportions given in the example, a dope is produced which may be used in the preparation of films for photographic purposes in the apparatus and by the methods customarily employed. Methyl acetanilid being representative of the whole group of equivalent substances will be always referred to hereinafter as typifying and meaning any one of the described substances.

Films produced from the hereinabove described composition contain sufficient methyl acetanilid in combination with the colloidized cellulose ether to maintain their flexibility even when they are heated for twelve weeks at 65° C. In practical use, where they are unlikely to meet any severer conditions, they maintain the necessary flexibility in a reliable way.

Stabilizers do not have to be employed alone, but other substances may be added to the dope which impart additional properties to it, such, for instance, as triphenyl or tricresyl phosphate, monochlornaphthalene, camphor, etc. The ingredients are of the ordinary commercial type sufficiently purified for the process of film manufacture so as to give dopes yielding films having the proper relative freedom from color.

Having thus described our invention, what we claim as new and desire to secure by Letters Patent is:

1. As an article of manufacture, a film comprising cellulose ether and a high boiling stabilizer which will maintain flexibility in the film after prolonged heating thereof at 65° C.

2. As an article of manufacture, a film comprising cellulose ether and methyl acetanilid.

3. As an article of manufacture, a transparent, flexible film for use as a photographic support comprising water-insoluble ethyl cellulose and methyl acetanilid to maintain its flexibility after prolonged heating for twelve weeks at 65° C.

4. A flowable film-forming composition comprising cellulose ether and a high boiling stabilizer capable of maintaining the flexibility of the finished film upon prolonged heating at 65° C., and a volatile liquid comprising a common solvent.

5. A flowable film-forming composition of matter comprising cellulose ether, methyl acetanilid dissolved in a common solvent.

6. A composition of matter comprising water-insoluble ethyl cellulose and methyl acetanilid dissolved in a solvent mixture of methyl acetate and methyl alcohol.

Signed at Rochester, New York, this 30th day of January 1923.

JOHN M. DONOHUE.
EDWARD S. FARROW, Jr.